J. HABENICHT & H. BECKE.
CARBURETER.
APPLICATION FILED FEB. 28, 1917.
1,250,163.
Patented Dec. 18, 1917.
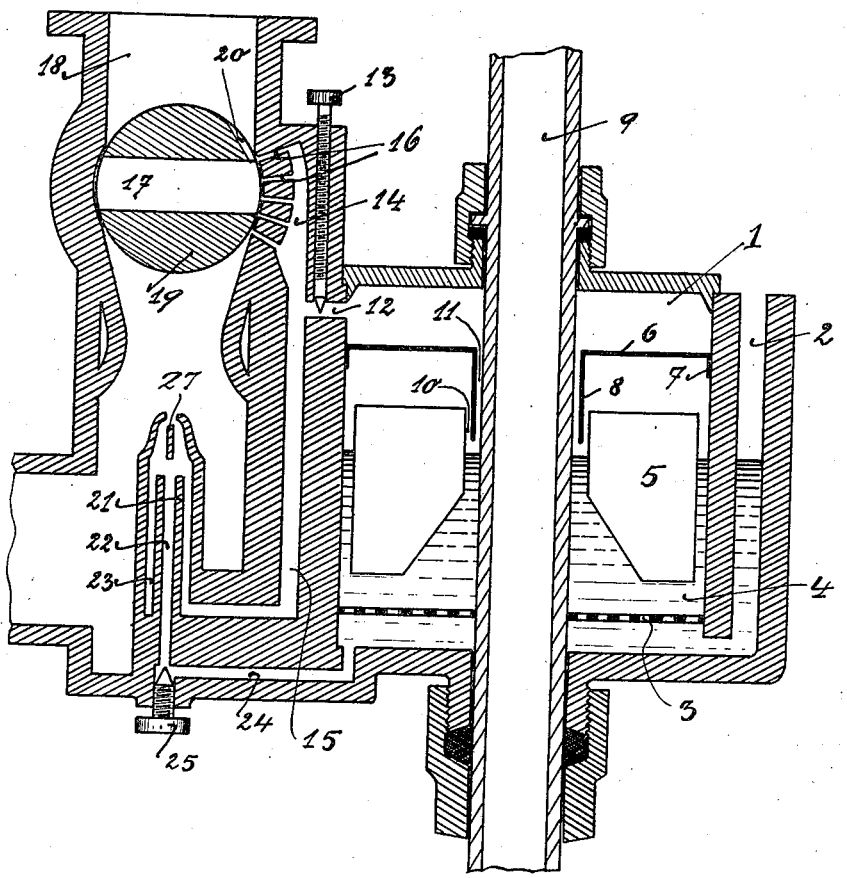

UNITED STATES PATENT OFFICE.

JOHANNES HABENICHT AND HERMANN BECKE, OF DRESDEN, GERMANY.

CARBURETER.

1,250,163.  Specification of Letters Patent.  Patented Dec. 18, 1917.

Application filed February 28, 1917. Serial No. 151,618.

*To all whom it may concern:*

Be it known that we, JOHANNES HABENICHT and HERMANN BECKE, both subjects of the Emperor of Germany, and both residing at Dresden, Kingdom of Saxony, Germany, have invented certain new and useful Improvements in Carbureters, of which the following is a full, clear, and exact specification.

The object of this invention is to provide a carbureter that will enable a prompt starting of the motor.

With this object in view, the air is sucked during the starting period of the motor through the fuel and thus becomes saturated with fuel and is then passed to the nozzle and intimately mixed with the liquid fuel.

In the accompanying drawing: The device is illustrated in its preferred form.

A chamber 1 for the reception of the liquid fuel 4 and a float 5 is connected by means of a conduit 2 with the atmosphere and has a strainer 3 near its bottom and a hood 6 serving as cover which is secured to the inner wall of the chamber 1 as at 7. The inner end 8 of the hood 6 is arranged in close proximity to the heating pipe 9, guided through the center of the casing or chamber 1, and extends downward beyond the upper edge of the float without however coming in contact with the liquid fuel.

Between the float 5 and the inner edge 8 of the hood, a free space 10 is provided and a similar free space 11 is arranged between the heating pipe 9 and the outer wall of the edge 8 of the hood. This hood is of evident utility in causing the fuel saturated air to pass up through the passage 11 in proximity to the heating pipe 9. A channel 12 connects the chamber 1 with the channel 14 leading to the suction pipe 18 by the way of slots 16, and a channel 15, leads to the gaseous mixture nozzle 21, while a screw valve 13 is provided for controlling the flow of the fuel saturated air into channels 14 or 15. A throttle valve 19 within the pipe 18 has a chamber 17 and a free space 20 adapted to communicate at a predetermined position of the throttle valve 19 with the slots 16 and through the channel 14 and the channel 12 with the fuel chamber, allowing the explosive mixture to enter pipe 18. The channel 15 which receives exclusively air saturated with fuel, leads to the nozzle 21 which consists of an inner nozzle 22 and an outer nozzle 23 which is connected to said channel 15. The inner nozzle 22 is connected to channel 24 which is in communication with the liquid fuel chamber 1, and a screw valve 25 controls the communication between the nozzle 22 and the channel 24.

The carbureter works in the following manner: When starting the motor the throttle valve 19 is in the position illustrated in the drawing. Through the space 20 in the throttle valve 19 a vacuum is produced above the liquid fuel 4 and the atmospheric air entering through the pipe 2 and through the strainer 3 passes through the liquid fuel 4 into the float chamber and during this passage is saturated with fuel. As the air cannot escape at 7, it is compelled to pass through the free space 10 and the space 11 whereafter it flows through the channel 12 either to the channel 14 or to the channel 15 according to the position of the valve 19.

If the slots 16 are in communication with the chamber 17, the fuel saturated air flows into channel 14 while the slots 16 may be all, or partially be closed by means of the throttle valve 19 according to the quantity of fuel saturated air.

If the chamber 17 is to receive a very rich mixture of the combustible, all the slots 16 will be closed, whereupon the fuel-saturated air passes through the channel 15 into the outer nozzle 23 of the nozzle 21 and mixes with the liquid fuel which passes through the channel 24 into the inner nozzle 22. Fuel and air closely and intimately mixed, then flow into the combustion chamber of the engine.

A partition 27 is provided above the nozzle 22 for dividing the fuel coming out of said nozzle and for intimately mixing it with the fuel saturated air coming from the nozzle 23.

It has been found very expedient to lead a heating pipe 9 through the chamber 1, through which warm water may be fed in order to pre-heat the fuel for facilitating the vaporization of even the heaviest fuel. The heating-pipe however can be dispensed with, if desired.

What we claim is:

1. In a carbureter of the character described, in combination, a float chamber adapted to receive the liquid fuel, a strainer near the bottom of said chamber, a float in said chamber, a double nozzle, a channel communicating with said chamber for leading atmospheric air through the fuel, a suction pipe, means for leading the fuel saturated air either to said suction pipe or to said nozzle according to the richness of the mixture required, means for leading liquid fuel to said nozzle, and means for controlling the quantity of fuel led to said nozzle and the amount of fuel saturated air to said suction pipe.

2. In a carbureter of the character described, in combination, a float chamber, adapted to receive the liquid fuel, a strainer near the bottom of said chamber, a float within said chamber, a double nozzle, a channel communicating with said chamber for leading atmospheric air through the fuel, a suction pipe, a chambered and recessed throttle, a channel and slots in the walls of the same for leading the fuel saturated air to said throttle, a double nozzle, and a channel for leading the fuel saturated air to the outer nozzle and a channel for leading the liquid fuel to the inner nozzle, and means for controlling the passage of the fuel saturated air and fuel admission.

In testimony whereof we affix our signatures in presence of two witnesses.

JOHANNES HABENICHT.
HERMANN BECKE.

Witnesses:
CLARE SIMON,
MARBA PUHEL.